United States Patent

Kuntze et al.

Patent Number: 5,924,614
Date of Patent: *Jul. 20, 1999

[54] ARTICLE CARRIER ASSEMBLY HAVING A CROSS RAIL ASSEMBLY LONGITUDINALLY ADJUSTABLE FROM ONE SIDE OF A MOTOR VEHICLE

[75] Inventors: Christopher J. Kuntze, Howell; James R. Drouillard, Lake Orion; John D. Michrina, Orion, all of Mich.

[73] Assignee: Decoma International Inc., Ontario, Canada

[*] Notice: This patent is subject to a terminal disclaimer.

[21] Appl. No.: 09/054,482

[22] Filed: Apr. 3, 1998

Related U.S. Application Data

[60] Provisional application No. 60/042,503, Apr. 3, 1997.

[51] Int. Cl.$^6$ .................................................... B60R 9/045
[52] U.S. Cl. .............................. 224/321; 224/322; 296/3
[58] Field of Search ................................... 224/309, 321, 224/322, 329, 400, 403, 404, 281; 410/134, 137; 296/3, 100.04

[56] References Cited

U.S. PATENT DOCUMENTS

| | | |
|---|---|---|
| 2,888,178 | 5/1959 | Olson . |
| 4,156,497 | 5/1979 | Bott . |
| 4,182,471 | 1/1980 | Bott . |
| 4,294,388 | 10/1981 | Wunstel . |
| 4,295,587 | 10/1981 | Bott . |
| 4,364,500 | 12/1982 | Bott . |
| 4,460,116 | 7/1984 | Bott . |
| 4,473,178 | 9/1984 | Bott . |
| 4,487,348 | 12/1984 | Mareydt . |
| 4,588,117 | 5/1986 | Bott . |
| 4,635,992 | 1/1987 | Hamilton et al. ................... 224/404 X |
| 4,684,048 | 8/1987 | Bott . |
| 4,705,198 | 11/1987 | Kamaya . |
| 4,722,646 | 2/1988 | McIntyre ............................. 410/137 X |
| 4,972,983 | 11/1990 | Bott . |
| 5,088,636 | 2/1992 | Barajas ................................ 224/404 X |
| 5,190,198 | 3/1993 | Cucheran . |

(List continued on next page.)

FOREIGN PATENT DOCUMENTS

| | | |
|---|---|---|
| 90/02668 | 3/1990 | WIPO . |
| 94/10007 | 5/1994 | WIPO . |

*Primary Examiner*—Gregory M. Vidovich
*Attorney, Agent, or Firm*—Pillsbury Madison & Sutro LLP

[57] ABSTRACT

The present invention is an article carrier assembly for mounting on an exterior surface of a motor vehicle, the article including a pair of elongated side rails constructed and arranged to be mounted on an exterior surface of the motor vehicle. The side rails extend generally parallel to one another in a spaced apart relation and an elongated adjustable cross rail assembly constructed and arranged to be mounted transversely between and releasably lockable along the side rails in a range of operating positions. The cross rail assembly has rail locking structures mounted on opposite ends thereof for selectively engaging the side rails. An actuator is operatively connected to the rail locking structures. The actuator is positioned such that an operator standing on one side of the vehicle can manipulate the actuator and move the cross rail assembly between the operating positions. The actuator assembly includes a rod extending from a distal one of the rail locking structures and pivotally connected to the actuator and a camming member frictionally engaging a near one of the rail locking structures. The near one of the rail locking structures is biased into engagement with the camming member. Pivotal movement of the actuator effects cooperative movement of the rail locking structures between locked positions wherein the rail locking structures engage the side rails to lock the cross rail assembly in one of the operating positions and disengage positions permitting longitudinal travel of the cross rail assembly along the side rails.

9 Claims, 4 Drawing Sheets

U.S. PATENT DOCUMENTS

| | | |
|---|---|---|
| 5,205,453 | 4/1993 | Pudney et al. . |
| 5,226,570 | 7/1993 | Pedrini . |
| 5,320,264 | 6/1994 | Weir . |
| 5,385,285 | 1/1995 | Cucheran et al. . |
| 5,386,674 | 2/1995 | Sfirakis et al. ................ 410/134 X |
| 5,397,042 | 3/1995 | Pedrini . |
| 5,423,465 | 6/1995 | Kauka et al. . |
| 5,470,003 | 11/1995 | Cucheran . |
| 5,472,256 | 12/1995 | Tucker . |
| 5,511,708 | 4/1996 | Cronce et al. . |
| 5,577,649 | 11/1996 | Lee, Jr. et al. . |
| 5,577,650 | 11/1996 | Stapleton . |
| 5,579,970 | 12/1996 | Cucheran et al. . |
| 5,588,572 | 12/1996 | Cronce et al. . |
| 5,622,298 | 4/1997 | Cucheran et al. . |
| 5,657,914 | 8/1997 | Stapleton . |

ARTICLE CARRIER ASSEMBLY HAVING A CROSS RAIL ASSEMBLY LONGITUDINALLY ADJUSTABLE FROM ONE SIDE OF A MOTOR VEHICLE

This application claims the benefit of U.S. Provisional Application No. 60/042,503, filed Apr. 3, 1997.

FIELD OF THE INVENTION

The present invention relates to article carrier assemblies for vehicles and, more particularly, to article carriers having a cross rail assembly which can be adjusted longitudinally of the vehicle from one side of the vehicle.

BACKGROUND OF THE INVENTION

A variety of article carrier assemblies have been developed for transporting articles or large cargo on the exterior surface of a vehicle. Such carriers are typically mounted on an exterior body portion of the vehicle such as the roof or the trunk thereof, and include a pair of side rails fixed to and extending longitudinally of the vehicle. Cross rail assemblies are connected so as to extend laterally between the side rails for supporting cargo placed on the article carrier assembly and also to provide a convenient tie down of the cargo or article to be transported.

Article carrier assemblies have been provided with slidable cross rail assemblies so as to facilitate transporting loads or cargo of different sizes. Typically, the cross rail assemblies are provided with supports at ends thereof which are slidable in a channel defined in each side rail. Latching mechanisms are provided to engage the side rails in a number of positions along the length of the side rails.

It is desirable to lock and release the movable cross rails from only one side of the vehicle since such adjustment can be performed by only one person. U.S. Pat. No. 5,190,198 and WO 94/10007 each discloses a vehicle article carrier having a locking structure which, when an actuator is operated from one side of the vehicle, is locked or unlocked permitting adjustment of the cross rail. However, this type of locking structure requires many interacting components which add to the overall complexity and cost of the article carrier.

Accordingly, a need exists to provide an article carrier that can be operated from one side of a vehicle which is simple in construction and economical to manufacture and maintain.

SUMMARY OF THE INVENTION

It is therefore an object of the present invention to meet the above-described need. The present invention is an article carrier assembly for mounting on an exterior surface of a motor vehicle, the article including a pair of elongated side rails constructed and arranged to be mounted on an exterior surface of the motor vehicle. The side rails extend generally parallel to one another in a spaced apart relation and an elongated adjustable cross rail assembly constructed and arranged to be mounted transversely between and releasably lockable along the side rails in a range of operating positions. The cross rail assembly has rail locking structures mounted on opposite ends thereof for selectively engaging the side rails. An actuator is operatively connected to the rail locking structures. The actuator is positioned such that an operator standing on one side of the vehicle can manipulate the actuator and move the cross rail assembly between the operating positions. The actuator assembly includes a rod extending from a distal one of the rail locking structures and pivotally connected to the actuator and a camming member frictionally engaging a near one of the rail locking structures. The near one of the rail locking structures is biased into engagement with the camming member. Pivotal movement of the actuator effects cooperative movement of the rail locking structures between locked positions wherein the rail locking structures engage the side rails to lock the cross rail assembly in one of the operating positions and disengage positions permitting longitudinal travel of the cross rail assembly along the side rails.

Other objects, features and characteristics of the present invention, as well as the method of operation and function of the related elements of the structure, and the combination of the parts and economics of manufacture, will become more apparent upon consideration of the following detailed description and appended claims with reference to the accompanying drawings, all of which form a part of this specification.

DETAILED DESCRIPTION OF THE PREFERRED EMBODIMENT

Referring to the drawings, an article carrier is shown, generally indicated at 10, which embodies the principles of the present invention.

Figure 1:
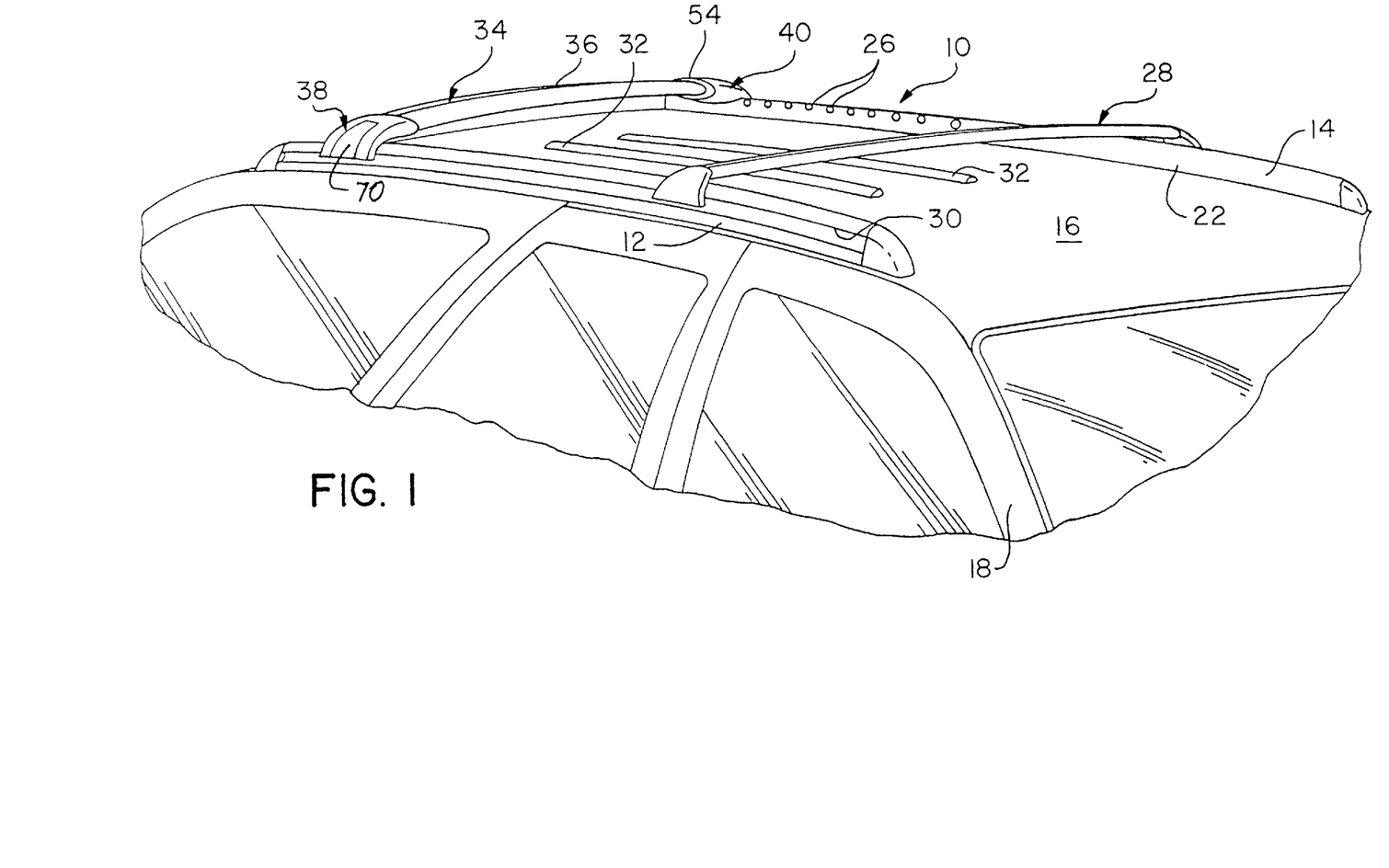
FIG. 1 is a perspective view of a roof portion of a vehicle having an article carrier assembly mounted thereon, provided in accordance with the principles of the present invention.

As shown in FIG. 1, the article carrier assembly 10 includes a pair of side rails 12 and 14, mounted in fixed, spaced relation on an upwardly exterior body surface 16 of a vehicle 18 and extending longitudinally of the vehicle. In the illustrated embodiment, the article carrier assembly 10 is disposed on a roof panel of the vehicle 18. It can be appreciated, however, that the article carrier assembly 10 could be mounted on the outer surface of a trunk of the vehicle or to the side rails of a pick up truck box.

Each of the side rails 12 and 14 is preferably roll formed and is of generally hollow configuration. The inner facing surface 20 and 22 of each side rail 12 and 14, respectively, includes a plurality of longitudinally spaced locking structure receiving indexing holes 24 and 26. The indexing holes 26 may be of any configuration, such as, for example, notches, holes, etc. which receive locking structure, as will become apparent below. In the illustrated embodiment, the apertures are in the form of generally circular indexing holes. The indexing holes 24 and 26 are oriented such that the indexing holes 24 formed in side rail 12 generally face inwardly toward the indexing holes 26 formed in the other side rail 14. The indexing holes 24 and 26 define a range of discrete operating positions along the length of each side rail structure 12 and 14 for attaching a cross rail assembly 34 with respect to the side rails 12 and 14. The side rails 12, 14 are generally identical and include a longitudinally extending groove 30 in an outer surface thereof. The groove 30 in rail 14 provides a clearance for manually grasping an actuator in the form of handle 54 in a locked position thereof to move the handle member 54 to an unlocked position, as will become apparent below. The groove 30 is provided in each of the side rails for styling and also, if the handle member 54 is mounted with respect to side rail 12, the handle thereof can be grasped at that side of the vehicle.

The side rails 12 and 14 may be formed of any suitable material for supporting articles, such as metal, plastic and combinations thereof. The side rails 12 and 14 are fixed to the vehicle body surface 16 by fasteners, adhesive, or the like.

As shown in FIG. 1, a plurality of slats 32 are spaced between the side rails 12 and 14. The slats 32 are fixed to the exterior body surface 16 in a manner similar to that of the side rails 12 and 14. Cargo may be placed on the slats 24 and secured by tying to a cross rail assembly. Thus, the slats 32 provide protection to the exterior body surface 16 of the vehicle.

The article carrier assembly 10 includes at least one conventional, stationary cross rail 28 and at least one adjustable cross rail assembly 34 extending between the side rails 12 and 14. With reference to FIG. 1, cross rail assembly 34 is movable longitudinally with respect to the side rails 12 and 14 within a range of operating positions, while cross rail 28 is fixedly mounted, by screws or the like, between the side rails 12 and 14. It can be appreciated that any number of cross rails and/or cross rail assemblies may be provided. Further, the stationary cross rail 28 may be replaced with another adjustable cross rail assembly 34. The cross rail assembly 28 is formed from any suitable material such as metal, plastic or combinations thereof. The adjustable cross rail assembly 34 is preferably formed from lightweight steel or metal or from molded plastic so as to be lightweight and thus capable of being lifted from one side of the vehicle, as will be explained in more detail below.

In the illustrated embodiment, the adjustable cross rail assembly 34 includes a roll-formed, generally tubular central portion 36 and a pair of injection molded plastic support structures, generally indicated at 38 and 40, extending from opposite ends of the cross rail assembly 36. The support structures 38 and 40 are constructed and arranged to be carried by an associated side rail structure 12 and 14.

Figure 2:
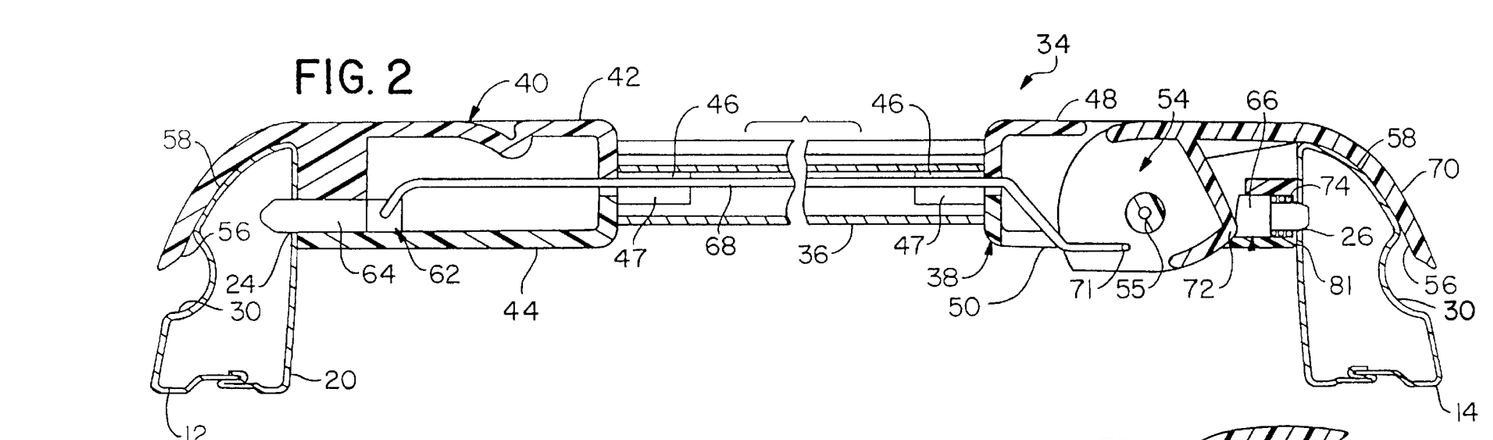
FIG. 2 is a schematic view, partially in section, of an article carrier assembly of the invention shown in a locked position.
Figure 4:
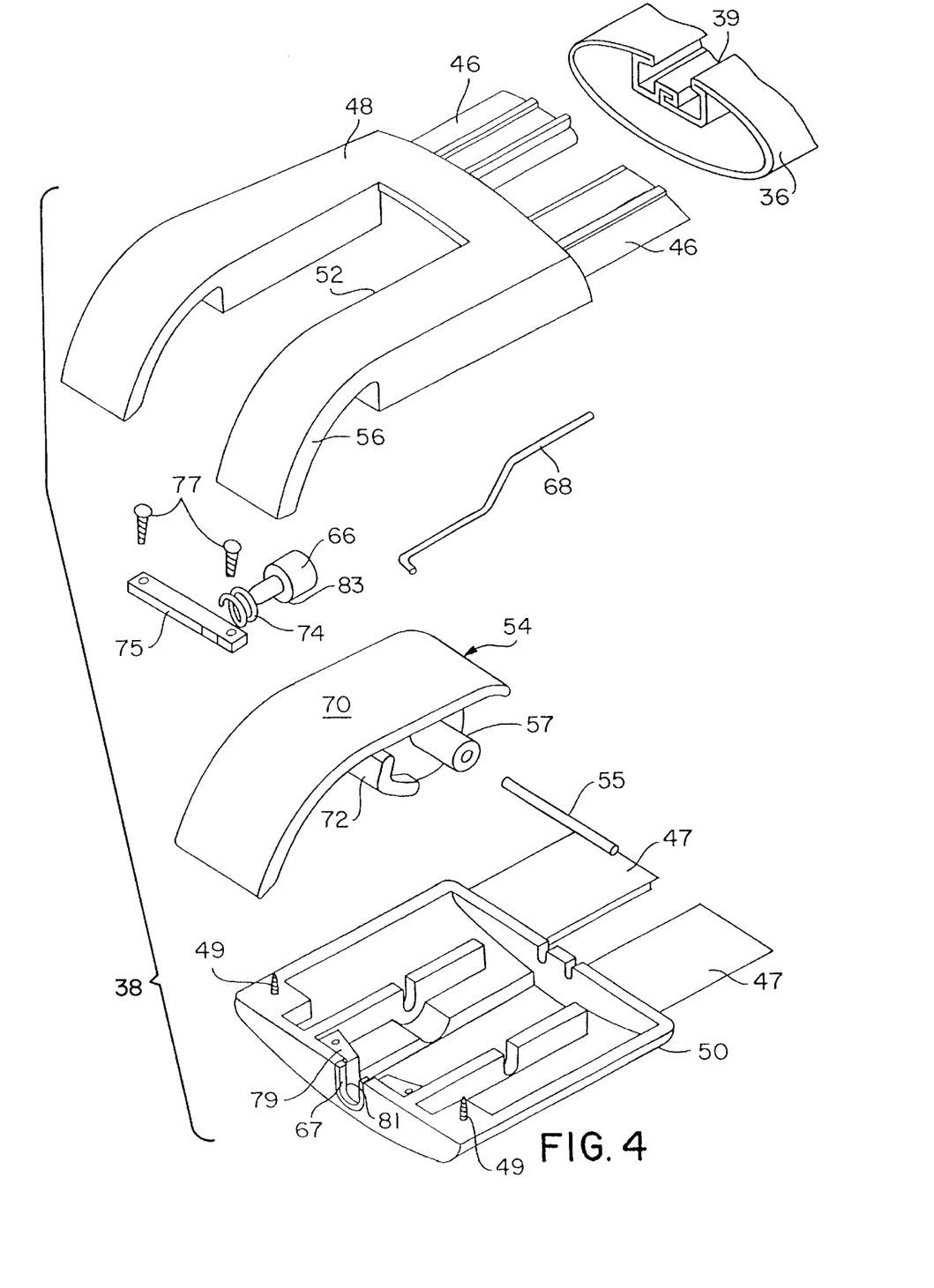
FIG. 4 is an exploded view of one of the supports and handle member of the cross rail assembly.
Figure 5:
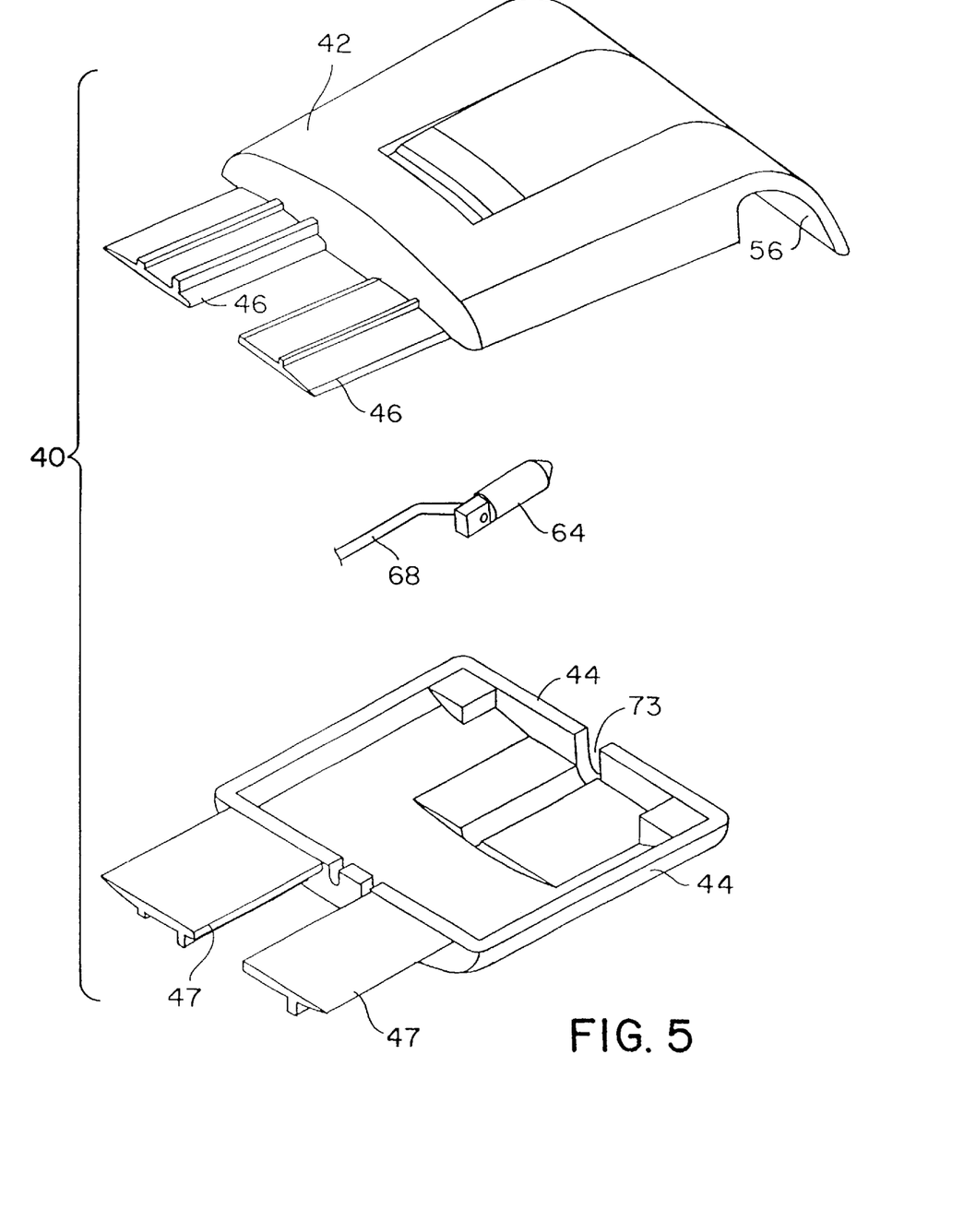
FIG. 5 is an exploded view showing the other support of the cross rail assembly.

With reference to FIG. 5, a non-handle associated support structure 38 includes an upper housing 42 and lower housing 44 which are coupled together to define the support structure 40. The housings 42 and 44 may be secured by any suitable means such as by a snap engagement, or by the use of screws or adhesives. In a similar manner, as shown in FIG. 4, a handle associated support structure 40 includes an upper housing 48 and a lower housing 50 coupled thereto by pins 49 or by adhesive. The upper housing 48 includes a cut-out 52 which accommodates the handle member 54. As shown in FIG. 2, when the handle member 54 is in a locked position, a gripping portion 70 thereof is generally flush with the outer surface of the upper housing 48, thereby defining an aerodynamic structure. When the handle member 54 is moved to an unlocked position the handle member 54 is disposed generally transverse with respect to the upper surface of the upper housing 48 so as to be easily recognized as being in an unlocked condition. The function of the handle member 54 will be described in detail below.

With reference to FIGS. 4 and 5, each support structure 38 and 40 includes upper attaching arms 46 and lower attaching arms 47 extending therefrom. As shown in FIGS. 2 and 4, the attaching arms 46 and 47 are engageable with the internal portion of the central tubular portion of the cross rail assembly 36 so as to couple the cross rail assembly to the supports 38 and 40. Each of the support structures 38 and 40 has a flange with a lower surface 56 which is constructed and arranged to mate with and be supported by the upper surface 58 of each side rail structure 12 and 14 such that the supports are carried by the side rails. The outer ends of each of the supports are tapered downwardly so as to provide a smooth appearance when the cross rail assembly 34 is mounted with respect to the side rails 12 and 14. The cross rail assembly 36 has a T-groove 39 (FIG. 4) extending the length of an upper surface thereof which receives bolting for securing cargo or the like.

The adjustable cross rail assembly 34 is constructed and arranged to be mounted such that it may be locked and released with respect to the side rails 12 and 14 from only one side of the vehicle 18. With certain vehicles, it may be desirable to mount the handle member 54 to be operable from the driver's side of the vehicle, while with other vehicle types, it may be better to operate the handle member 54 at the passenger side of the vehicle. Thus, it is within the contemplation of the invention to provide a cross rail assembly 34 which is capable of being mounted with the handle member 54 disposed at either side of the vehicle, as will be appreciated below.

The adjustable cross rail assembly 34 includes side rail locking structures 64, 66 operatively mounted at opposing end thereof. The side rail locking structures 64, 66 are constructed and arranged to be moved between a locked position and an unlocked position. In the locked position, the side rail locking structures 64, 66 are engaged with certain of the apertures 24 and 26, thereby preventing longitudinal adjusting movement of the cross rail assembly 34 with respect to the side rails 12 and 14 within the range of operating positions. In the unlocked position, the side rail locking structures 64, 66 are removed from engagement with certain of the apertures 24 and 26, thereby permitting the adjustable cross rail assembly 34 to be moved manually into alignment with other apertures 24 and 26 corresponding to a desired one of the range of operating positions so as to adjust the position of the cross rail assembly 34 longitudinally with respect to the side rails 12 and 14.

The side rail locking structure 64 opposite the handle member 54 is operatively connected to the handle member 54 via a pushing structure in the form of a rod 68. One end of the rod 68 is pivotally coupled to the handle member 54 at pivot 71 while the other end of the rod is coupled to the side rail locking structure. The rod 68 extends through channels defined in each end of the supports 38 and 40 and through the interior of the cross rail assembly 36. In the broadest aspects of the invention, the rod 68 may be considered an extension of the side rail locking structure 64. The side rail locking structure 64 opposite the handle member 54 is cylindrical and constructed and arranged to engage with the indexing holes 24 in the side rail structure 12.

The handle member 54 is pivotally coupled to support 38 by rod 55 extending through boss 57. The handle member 54 also includes a gripping portion 70 and a camming member providing a cam surface 72, the function of which will become apparent below. The side rail locking structure 66 adjacent the handle member 54 is disposed adjacent the cam surface 72 of the handle member 54. The side rail locking structure 66 is also cylindrical and constructed and arranged to engage with indexing holes 26 in side rail structure 14. The side rail locking structure 66 is biased by a biasing element in the form of a spring 74 in a direction away from engagement with the indexing holes 26. The side rail locking structure 66 and spring 74 is mounted within the support structure 38 by the use of a plate 75 which is secured via screws 77 to boss 79 formed in the lower housing 50. As shown in FIG. 4, the lower housing 50 also has a seat 81 upon which an end of the spring 74 rests. The other end of the spring 74 engages the annular seat 83 of the locking structure 66.

In the illustrated embodiment, the rod 68 is a rigid steel rod and the side rail locking structures are also rigid and made of any suitable material such as steel, metal or rigid plastic. The side rail locking structures 64 and 66 and indexing holes 24 and 26 are configured so that the side rail locking structures 64, 66 may be received in either sets of holes 24 and 26, thereby permitting the cross rail assembly 34 to be mounted with the handle member 54 located at either the passenger side or driver's side of the vehicle. It is to be understood that, although the illustrated embodiment depicts the side rail locking structures 64, 66 moving linearly away from one another in directly opposite directions, the present invention contemplates that the side rail locking structures 64, 66 may be moved in other manners. It is not necessary, although preferable, that they move in directly opposite directions away from each other. For example, it is contemplated that the side rail locking structures 64,66 may move in generally the same direction, rather than in opposite directions.

With reference to FIG. 2, when the handle member 54 is gripped by the gripping portion 70 thereof and moved to a locked position thereof, the cam surface 72 of the handle member 54 engages the side rail locking structure 66 adjacent the handle member 54 and moves the second pin generally linearly against the bias thereon such that the side rail locking structure 66 is moved through aperture 67 in the handle associated support structure 40 and into engagement with one of the indexing holes 26 in the side rail 14. The movement of the handle member 54 simultaneously causes the rod 68 to push the side rail locking structure 64 opposite the handle member 54 generally linearly through aperture 73 in non-handle associated support structure 40 and into engagement with an indexing hole 24 in the side rail structure 12. Thus, the side rail locking structures 64 and 66 are moved to engaged positions to prevent longitudinal adjusting movement of the cross rail assembly 34 with respect to the side rail structure 12 and 14 within the range of operating positions. As can be appreciated from the Figures, the side rail locking structure 64 opposite the handle member 54 travels in the same direction as the rod 68. It is contemplated, however, that the side rail locking structure 64 may travel at an angle with respect to the rod 68 in generally the same direction as the rod 68.

Figure 3:
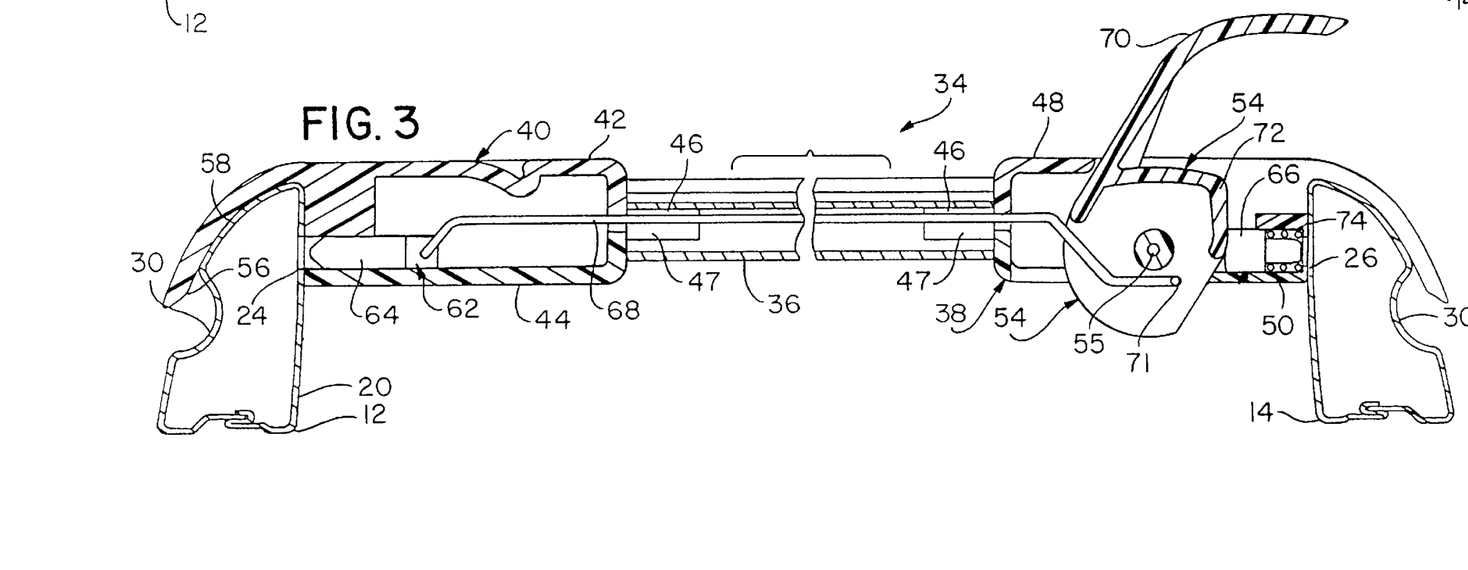
FIG. 3 is a schematic view, partially in section, of the article carrier assembly of the invention shown in a released position.

As noted above, to accommodate various loads, it is desirable to be able to move the cross rail assembly 34 longitudinally with respect to the side rails 12 and 14 within the range of operating positions to vary the distance between assembly 34 and stationary cross rail 28. When such adjustment is required, the handle member 54 is simply rotated upwardly from the locking position to an unlocked position (FIG. 3). This movement permits the side rail locking structure 66 adjacent the handle member to ride the cam surface 72 which enables the bias on side rail locking structure 66 to move it from engagement with the associated indexing hole 26 to the disengaged position thereof. The upward movement of the handle 54 also moves the rod 68 and side rail locking structure 64 connected therewith linearly such that the side rail locking structure 64 is moved from engagement with the indexing hole 24 in the side rail structure 12 to the disengaged position thereof. The movement of the side rail locking structures 64 and 66 occurs generally simultaneously and once the cross rail assembly 64 is disengaged from locking relation with the side rails 12 and 14, the adjustable cross rail assembly 34 may be simply lifted or slid longitudinally with respect to the side rails from an initial one of the range of operating positions to a desired one of the range of operating positions and into alignment with other indexing holes 24 and 26 provided in the side rails. Once the desired position is located, the handle member 54 is moved from the upward, unlocked releasing position to the locking position thereof. This action causes the cam surface 72 to move the side rail locking structure 66 adjacent the handle member 54 into engagement with the newly selected indexing hole 26 in side rail structure 14 while the rod 68 and side rail locking structure 64 opposite the handle member 54 are moved linearly outwardly such that the side rail locking structure 64 engages the newly selected indexing hole 24 in the side rail structure 12, thus again locking the cross rail assembly 34 with respect to the side rail structure.

It can be appreciated that the side rails may include structure other than the apertures. For example, the side rails may have a resilient, elastomeric member for receiving the side rail locking structure, as disclosed, for example in U.S. Patent Application of Drouilliard et al., entitled "Article Carrier Assembly Having a Cross Rail Assembly Longitudinally Adjustable Within a Range of Infinite Operating Positions", filed even date herewith, the entirety of which is hereby incorporated by reference into the present specification. Also, it is contemplated that the side rail locking structures may have a plurality of serrations for engaging corresponding serrations on the side rails, an example of which is disclosed in pending U.S. Patent Application of Reichenberger et al. entitled "Article Carrier Assembly Having a Cross Rail Assembly with a Turnable Locking Mechanism" filed even date herewith, the entirety of which is hereby incorporated into the present application by reference.

It can be appreciated that since the adjustable cross rail assembly 34 is of light-weight construction, the assembly 34 can be easily lifted or slid along the side rails to a selected position along the extent of the side rails from only one side of the vehicle.

It can be seen that the article carrier 10 of the present invention provides an effective means for carrying a variety of different sized cargo due to the adjustable cross rail assembly. The ability to adjust the cross rail assembly from one side advantageously enables one person to perform the adjustment.

While the invention has been described in connection with what is presently considered to be the most practical and preferred embodiment, it is understood that the invention is not limited to the disclosed embodiments but, on the contrary, is intended to cover various modifications and equivalent arrangements included within the spirit and scope of the appended claims.

What is claimed is:

1. An article carrier assembly for mounting on an exterior surface of a motor vehicle, said article carrier assembly comprising:

a pair of elongated side rails constructed and arranged to be mounted on an exterior surface of the motor vehicle, said side rails extending generally parallel to one another in a spaced apart relation; and an elongated adjustable cross rail assembly constructed and arranged to be mounted transversely between and releasably lockable along said side rails in a range of operating positions, said cross rail assembly having:

rail locking structures mounted on opposing ends thereof for selectively engaging said side rails; and an actuator operatively connected to the rail locking structures, said actuator positioned such that an operator standing on one side of the vehicle selectively manipulates the actuator and moves said cross rail assembly between said operating positions, said actuator comprising a push rod extending from a distal one of said rail locking structure and pivotally connected to said actuator and a camming member frictionally engaging a near one of said rail locking structures and pivotally connected to said actuator, said near one of said rail locking structures having a biasing element constructed and arranged to bias said near one of said rail locking structures into engagement with the camming member, whereby pivotal movement of the actuator effects cooperative movement of the rail locking structures between (a) locked positions wherein the rail locking structures engage the side rails to lock said cross rail assembly in one of said operating positions as a result of said camming member camming said near one of said rail locking structures and said push rod pushing said distal one of said rail locking structures and (b) unlocked positions wherein said rail locking structures are respectively disengaged from said side rails to permit longitudinal travel of said cross rail assembly along said side rails.

2. An article carrier assembly according to claim 1 wherein said adjustable cross rail assembly moves slidably along said side rails as it travels longitudinally with respect to said side rails.

3. An article carrier assembly according to claim 1 wherein said adjustable cross rail assembly engages upper surfaces of said side rails, said adjustable cross rail assembly moving slidably along said upper surfaces of said side rails as it travels longitudinally with respect to said side rails.

4. The article carrier assembly according to claim 3 wherein said actuator is a handle which overlaps one of said side rails, said one of said side rails having a longitudinally extending clearance groove formed on an outer surface thereof, said clearance groove being adapted to facilitate manual grasping of said handle when said rail locking structures are in the locked positions thereof with the handle overlapping one of said side rails.

5. The article carrier assembly according to claim 1, wherein each of said side rails have a plurality of inwardly facing locking structure receiving openings spaced longitudinally along a longitudinally extending portion thereof;

said rail locking structures being configured to be inserted respectively in said locking structure receiving openings of said side rails when in said locked positions thereof.

6. The article carrier assembly according to claim 5 wherein said locking structure receiving openings are generally circular and said rail locking structures are generally cylindrical pins.

7. The article carrier assembly according to claim 4 wherein said adjustable cross rail assembly comprises:

a central tubular portion;

a handle associated support structure disposed at one of said opposing ends of said adjustable cross rail assembly, said handle associated support structure comprising:

an upper housing portion and a lower housing portion coupled to one another to define said handle associated support structure, said handle associated support structure being constructed and arranged to engage and be supported by one of said side rails when said cross rail assembly is mounted transversely with respect to said side rails in one of said range of operating positions;

said handle associated support structure having an aperture for slidably receiving said push rod;

a pivot rod adapted to pivotally mount said handle and said camming member within said handle associated support structure;

said handle associated support structure having attaching arms extending therefrom, said attaching arms being constructed and arranged such that said handle associated support structure is attached to said central tubular portion by inserting said attaching arms thereof into an opening provided at one end of said central tubular portion such that said attaching arms are in engagement with interior surfaces of said central tubular portion at said one end thereof; and said handle associated support structure having an opening to allow the rail locking structure near said handle to be mounted within said handle associated support structure and move between said locked positions thereof and said unlocked positions thereof; and a non-handle associated support structure disposed at the other of said opposing ends of said adjustable cross rail assembly opposite said handle associated support structure, said non-handle associated support structure comprising:

upper and lower housing portions constructed and arranged to be coupled to one another to define said non-handle associated support structure, said non-handle associated support structure being constructed and arranged to engage and be supported by the other of said side rails when said adjustable cross rail assembly is mounted transversely with respect to said side rails in one of said range of operating positions;

said non-handle associated support structure having an aperture for slidably receiving said push rod;

said non-handle associated support structure having attaching arms extending therefrom, said attaching arms being constructed and arranged such that said non-handle associated support structure is attached to said central tubular portion by inserting said attaching arms thereof into an opening provided at the end of said central tubular portion opposite said handle associated support structure such that said attaching arms are in engagement with interior surfaces of said central tubular portion at said end thereof opposite said handle associated support structure;

said non-handle associated support structure having an opening to allow the rail locking structure distal said handle to be mounted therein and move between the locked positions thereof and the unlocked positions thereof.

8. The article carrier assembly according to claim 7 wherein said handle associated support structure and said non-handle associated support structure of said adjustable cross rail assembly each have flanges disposed on outer ends thereof, said flanges having downwardly facing surfaces positioned and configured to engage and be supported by upwardly facing surfaces of said side rails when said adjustable cross rail assembly is mounted transversely between said side rails in one of said range of operating positions.

9. An article carrier assembly according to claim 8 wherein said handle extends outwardly and upwardly with respect to said adjustable cross rail assembly when said rail locking structures are in the unlocked positions thereof so that it can be easily visually detected by an operator that said rail locking structures are in the unlocked positions thereof.

* * * * *